(12) United States Patent
Engi et al.

(10) Patent No.: US 12,080,105 B2
(45) Date of Patent: Sep. 3, 2024

(54) TECHNIQUES FOR AUTHENTICATING A USER

(71) Applicant: Cisco Technology, Inc., San Jose, CA (US)

(72) Inventors: Derek William Engi, Pleasant Ridge, MI (US); Gonzalo Salgueiro, Raleigh, NC (US); Pascale Delaunay, La Verne, CA (US); Julie Allen, Sioux Falls, SD (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 17/378,013

(22) Filed: Jul. 16, 2021

(65) Prior Publication Data
US 2023/0018509 A1    Jan. 19, 2023

(51) Int. Cl.
| | |
|---|---|
| *G06K 9/62* | (2022.01) |
| *G06V 20/00* | (2022.01) |
| *G06V 40/16* | (2022.01) |
| *G06V 40/50* | (2022.01) |
| *H04L 9/40* | (2022.01) |

(52) U.S. Cl.
CPC .............. *G06V 40/50* (2022.01); *G06V 20/00* (2022.01); *G06V 40/172* (2022.01); *H04L 63/0861* (2013.01)

(58) Field of Classification Search
CPC ........................................ G06V 40/16–40/179
See application file for complete search history.

(56) References Cited

U.S. PATENT DOCUMENTS

| | | | |
|---|---|---|---|
| 8,941,741 B1 | 1/2015 | McDonough et al. | |
| 11,126,705 B2 * | 9/2021 | Agrawal | ................ H04L 63/08 |
| 11,138,820 B1 * | 10/2021 | Shen | ................... G06V 40/172 |
| 2016/0335511 A1 * | 11/2016 | MacDonald | .......... G06V 40/45 |
| 2018/0373858 A1 | 12/2018 | Farkash et al. | |
| 2019/0095737 A1 | 3/2019 | Hecker et al. | |
| 2019/0166119 A1 | 5/2019 | Hecker et al. | |

(Continued)

OTHER PUBLICATIONS

"Google Cloud Vision vs Amazon Rekoginition: Which is Better?" <<https://webuters.medium.com/google-cloud-vision-vs-amazon-rekoginition-which-is-better-c7cb4780d82a>>, Retrieved on Nov. 17, 2023, 9 pages.

(Continued)

*Primary Examiner* — Brian Werner
(74) *Attorney, Agent, or Firm* — Lee & Hayes, P.C.

(57) ABSTRACT

This disclosure describes techniques for authenticating a user. For instance, a system may initially generate and then store authentication data for later authenticating the user. The authentication data may include biometrics data (e.g., facial recognition data), credentials data (e.g., a username, password, etc.), and/or environmental data (e.g., object(s) located within an environment). Later, the system may receive image data generated by a user device of the user. In some examples, the system may then analyze the image data using one or more facial recognition techniques in order to identify the user. The system may then use the authentication data, such as the environmental data, to determine that the image data further represents the object(s). Based on determining that the image data further represents the object(s), the system may then verify the user for access to a resource.

18 Claims, 8 Drawing Sheets

(56) References Cited

U.S. PATENT DOCUMENTS

2019/0207930 A1    7/2019  Vendrow
2021/0173916 A1*   6/2021  Ortiz ..................... H04L 9/3213
2022/0405366 A1*  12/2022  Heuman ................ G06F 21/32

OTHER PUBLICATIONS

Cheng et al. "Augmented Reality Dynamic Image Recognition Technology Based on Deep Learning Algorithm" <<https://ieeexplore.ieee.org/document/9149876>>, Retrieved on Nov. 17, 2023, 21 pages.
Coldewey, "Visual One smartens up home security cameras with object and action recognition", <<https://techcrunch.com/2020/03/11/>>, Retrieved on Nov. 17, 2023, 10 pages.
Wong, et al. "Stationary Hand Gesture Authentication Using Edit Distance on Finger Pointing Direction Interval", <<https://www.hindawi.com/journals/sp/2016/7427980/>>, Retrieved on Nov. 17, 2023, 28 pages.
Xiao et al., "Multi-target video-based face recognition and gesture recognition based on enhanced detection and multi-trajectory incremental learning" <<https://www.ncbi.nlm.nih.gov/pmc/articles/PMC7369046/>>, Retrieved on Nov. 17, 2023, 14 pages.

* cited by examiner

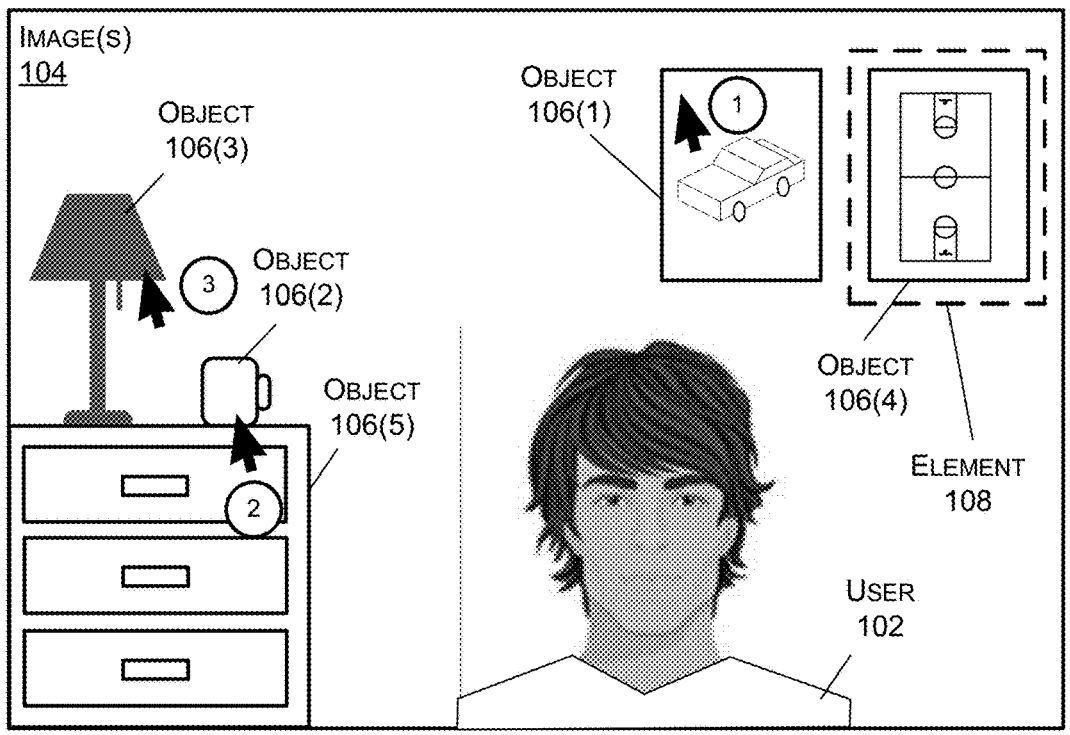
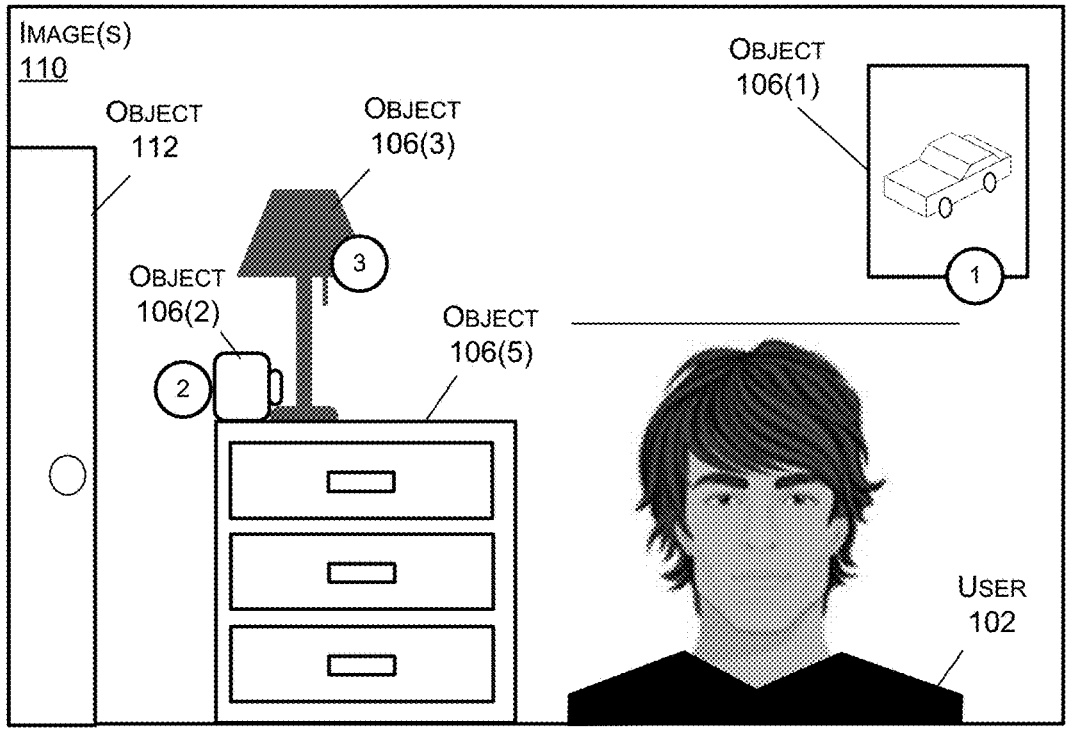
FIG. 1

TECHNIQUES FOR AUTHENTICATING A USER

TECHNICAL FIELD

The present disclosure relates generally to techniques for authenticating a user.

BACKGROUND

Multi-factor authentication is a technique to authorize a user for access to a resource, such as a network device, a system, a website, an application, or an online meeting. For example, when the user attempts to access the resource, the user may need to supply information for performing the multi-factor authentication. In some circumstances, the information may include both biometrics associated with the user (e.g., an image for facial recognition) as well as inputted knowledge of the user, such as in the form of credentials. While multi-factor authentication is a more secure technique for authorizing the user, a nefarious actor may still be able to obtain the user's information (e.g., a picture of the user along with the credentials) and then attempt to use the information to access the resource. As such, new techniques for verifying the identities of users may help improve the security of the multi-factor authentication.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIG. 1 illustrates an example of setting up multi-factor authentication and then using the multi-factor authentication to authenticate a user, in accordance with the present concepts.

DESCRIPTION OF EXAMPLE EMBODIMENTS

Overview

Figure 2:
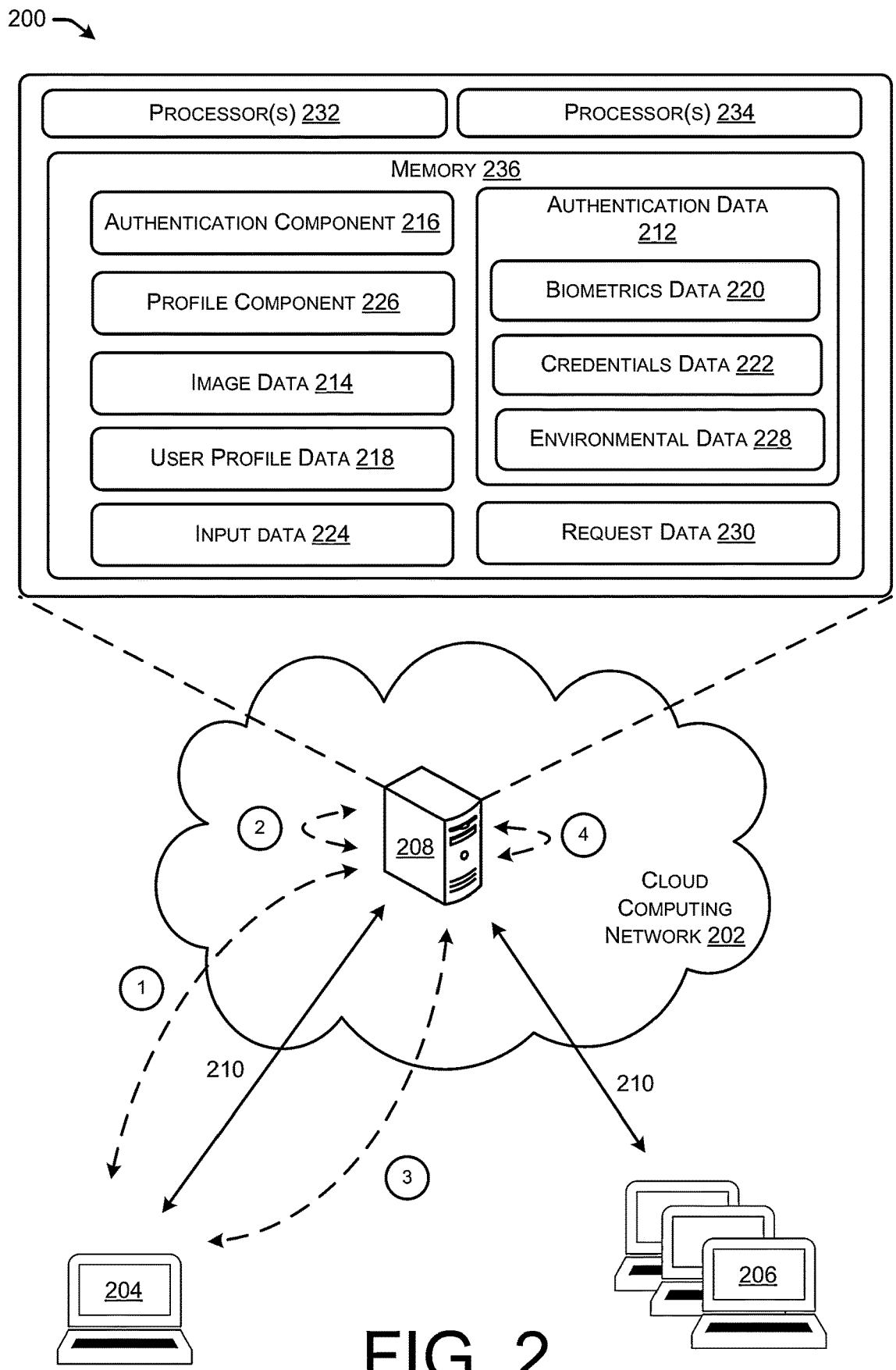
FIG. 2 illustrates a component diagram with an example environment in which techniques for authenticating a user may be provided, in accordance with the present concepts.

This disclosure describes, at least in part, a system that is configured to receive image data generated by a user device and then determine that the image data represents a user. The system is also configured to identify user profile data associated with the user. Furthermore, the system is configured to receive input data from the user device and determine that the input data indicates an object represented by the image data. Moreover, the system is configured to store, in association with the user profile data, authentication data associated with the object.

This disclosure also describes, at least in part, a method that includes receiving image data generated by a user device and then determining that the image data represents a user. The method additionally includes identifying user profile data associated with the user. Furthermore, the method includes sending, to the user device, a request to select one or more objects represented by the image data and then receiving, from the user device, input data indicating at least an object from the one or more objects. Moreover, the method includes storing, in association with the user profile data, authentication data associated with the object.

This disclosure further describes, at least in part, a system that is configured to receive image data generated by a user device and then determine that the image data represents a user. The system is additionally configured to identify user profile data associated with the user. Furthermore, the system is configured to determine a first object represented by the image data and determine a second object represented by the image data. Moreover, the system is configured to determine an order that includes the first object followed by the second object and then store, in association with the user profile data, authentication data that represents the order.

Example Embodiments

This disclosure describes, at least in part, techniques for authenticating a user. For instance, a system may initially generate and then store data (referred to, in these examples, as authentication data) for later authenticating the user. The authentication data may include, but is not limited to, biometrics data (e.g., facial recognition data), credentials data (e.g., a username, password, etc.), and/or environmental data. In some examples, the environmental data may represent one or more objects associated with an environment of the user and/or an order for the object(s). The system may then later use the authentication data to authenticate the user when accessing a resource. For example, the system may receive image data generated by a user device of the user. In some examples, the system may then analyze the image data using one or more image processing techniques (e.g., one or more facial recognition techniques) in order to identify the user. The system may then use the authentication data, such as the environmental data, to determine that the image data further represents the object(s). Based on determining that the image data further represents the object(s), the system may then authenticate the user for access to the resource.

For more details, the system may initially generate the authentication data for the user. To create the authentication data, the system may receive, from a user device associated with the user, image data (referred to, in these examples, as "first image data") representing at least the user and an environment for which the user is located. The system may then determine that the first image data represents the user. In some examples, to determine that the first image data represents the user, the system may analyze the first image data using one or more image processing techniques (e.g., using one or more facial recognition techniques). Additionally, or alternatively, in some examples, to determine that the first image data represents the user, the system may receive, from the user device, data representing credentials (e.g., a username, password, etc.) associated with the user. While these are just a few example techniques of how the system may determine that the first image data represents the user, in other examples, the system may perform one or more additional and/or alternative techniques.

The system may then request that the user select object(s) for the multi-factor authentication. In some examples, the request indicates candidate object(s) that the user may select for the multi-factor authentication. For example, the system may initially analyze the first image data using one or more object recognition techniques. Based on the analysis, the system may identify object(s) represented by the first image data. For example, the system may identify that a first portion of the first image data represents a first object (e.g., a picture frame), a second portion of the first image data represents a second object (e.g., a coffee cup), a third portion of the first image data represents a third object (e.g., a lamp), a fourth portion of the first image data represents a fourth object (e.g., a table), and/or so forth. In examples where the system performs such an analysis, the request may then include identities (e.g., names) associated with the candidate object(s) and/or locations of the candidate object(s) within the environment.

After the system sends the request to the user device, the user may begin selecting object(s), represented by the first image data, for the authentication. For example, and using the example above where the first image data represents the four different objects, the user device may receive a first input selecting the first object and a second input selecting the third object. In other words, the user may select both the first object and the third object for the multi-factor authentication. Additionally, in some examples, the user may specify an order for the selected object(s). For example, and again using the example above where the user initially selects the first object and the third object, the user device may then receive a third input indicating an order for the objects that includes selecting the first object before selecting the third object. The system may then receive, from the user device, data (e.g., input data, environmental data, etc.) representing the selected object(s) and/or the order for the selected object(s).

In some examples, the user may select passive object(s) and/or active object(s) for the multi-factor authentication. As described herein, a passive object may include an object that will likely remain within the field of view (FOV) of the camera of the user device whenever the system is attempting to authenticate the user and/or while the user is accessing the resource (e.g., during an online meeting). For example, and using the examples above with the four different objects, a passive object may include the first object, which is the picture frame in the example, since the first object is likely to remain in the FOV of the user device (e.g., as long as the user remains in the same environment during each authentication). Additionally, as described herein, an active object may include an object that the user is able to show the camera during the multi-factor authentication (e.g., the object may not initially be in the FOV of the camera). For example, and again using the examples above with the four different objects, an active object may include the second object, which is the coffee cup in the example, since the second object may not always be located in the FOV of the camera. However, as long as the user is in possession of the second object, the user may place the second object in the FOV of the camera during the multi-factor authentication.

After receiving the data from the user device, the system may use the data to determine the object(s) and/or the order for the object(s). For example, and using the examples above, the system may analyze the data to determine that the user selected the first object and the third object and/or determine that the user selected the order for the objects that includes the first object followed by the third object. The system may then generate the environmental data representing the object(s) and/or the order for the object(s) and store the environmental data in association with user profile data, where the user profile data represents a user profile of the user. In some examples, the system may also generate and then store the biometrics data and/or the credentials data in association with the user profile data (e.g., if the system has not previously generated and/or stored the biometrics data and/or the credentials data). The system may then use the authentication data to later authenticate the user.

For example, the system may receive, from the user device (and/or another user device), a request to access a resource. As described herein, a resource may include, but is not limited to, a network device, a system, a website, an application, an online meeting, and/or any other network resource. The system may also receive, from the user device (and/or the other user device), image data (referred to, in these examples, as "second image data") representing the user and/or an environment at which the user is located. In some examples, the system may then perform a first factor of a multi-factor authentication. For a first example, to perform the first factor of the multi-factor authentication, the system may analyze the second image data using one or more image processing techniques (e.g., using one or more facial recognition techniques). For a second example, to perform the first factor of the multi-factor authentication, the system may receive, from the user device (and/or the other user device), data representing credentials (e.g., a username, password, etc.) associated with the user profile. In either of the examples, the system may then identify the user profile data associated with the user.

The system may then perform the second factor of the multi-factor authentication using the environmental data stored in association with the user profile data. For example, the system may analyze the second image data in order to determine that the second image data represents the object(s) selected by the user. For instance, and using the examples above, the system may authenticate the user based on the second image data representing both the first object and the third object selected by the user. Additionally, in some examples where the user provides an order for the objects, the system may further request that the user select the object(s) in the order provided by the user. In such examples, the user device (and/or the other user device) may receive inputs selecting the objects in the specified order. For instance, and again using the examples above, the user device (and/or the other user device) may receive a first input selecting the first object followed by a second input selecting the third object. The system may then receive, from the user device (and/or the other user device), data indicating that the first object was selected before the second object. The system may then use the data to determine that the user selected the objects in the correct order and, in response, authenticate the user.

While the examples above describe the second image data initially representing the object(s) selected by the user (e.g., the object(s) include "passive objects(s)"), in other examples, the second image data may not initially represent an object (e.g., the object includes an "activate object"). For example, the object may be specific to the user, such as the coffee cup, that is carried by the user, but not initially within the FOV of the camera. In such an example, the system may generate data representing a request to show the object and send the data to the user device (and/or the other user device). The user device (and/or the other user device) may then output the request to the user. In response, the system may receive, from the user device (and/or the other user device), image data (referred to, in these examples, as "third image data") representing the user showing the object. The system may then authenticate the user using the third image data.

Additionally, while the examples above describe the user as selecting object(s) for the multi-factor authentication, in other examples, the system may additionally and/or alternatively select object(s) for the multi-factor authentication. For example, the system may continue to receive image data representing the user and use the image data for the multi-factor authentication. Additionally, the system may continue to analyze the image data and, based on the analysis, determine that the image data represents a same object. As such, the system may generate environmental data representing the object and then store the environmental data in association with the other authentication data. The system may then use this new environmental data when performing the multi-factor authentication. By having the system automatically generate new environmental data, without input from the user, the system may increase the security of the multi-factor authentication by increasing the number of object(s) that the system uses for the multi-factor authentication.

By performing the processes described herein, the system may increase the security of multi-factor authentication. For example, the user is able to select the object(s) and/or the order for the object(s) that the system then uses for the multi-factor authentication. This way, the user may be the only person to know which object(s) and/or which order for the object(s) to select, which makes it difficult for a nefarious actor even if the nefarious actor is able to reconstruct an environment that is similar to the environment that is used by the user. Additionally, the multi-factor authentication process described herein may only require that the image data represents the selected object(s). This way, even if the FOV of the camera of the user device changes, or if the user moves to a new environment, the system is still able to authenticate the user using the object(s) as long as the object(s) are still in the FOV of the camera of the user device.

As described herein, the system may analyze the image data using one or more computer-vision techniques, such as for object recognition and/or facial recognition. For example, and for object recognition, the system may use a fast region-based convolutional network algorithm, a histogram oriented gradient algorithm, a region-based convolutional neural network algorithm, a region-based fully convolutional network algorithm, a spatial pyramid pooling algorithm, and/or any other type of algorithm. Additionally, and for facial recognition, the system may use a traditional facial recognition algorithm, a human identification at a distance algorithm, a 3-dimensional recognition algorithm, and/or any other type of algorithm.

Additionally, as described herein, the system may allow the user to select object(s) for the multi-factor authentication. As described herein, an object may include, but is not limited to, a picture frame, a coffee cup, a lamp, a desk, a door, a badge, an item of clothing, a pen, a window, furniture, and/or any other type of object. Additionally, an object may include a passive object, such as a picture frame, that will likely remain in the FOV of the user device, such as while the user is accessing the resource. Alternatively, the object may include an active object, such as a badge, a coffee cup, a tag, and/or the like, that the user will display to the camera when accessing the resource. As described herein, by associating an active object with the multi-factor authentication, the system is able to authenticate the user even when the user changes environments as long as the user is still in possession of the object.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example of setting up multi-factor authentication and then using the multi-factor authentication to authenticate a user 102, in accordance with the present concepts. For instance, at a first time which is shown by the top illustration, the system may receive first image data representing first image(s) 104. As shown, the first image data represents at least the user 102, a first object 106(1) (e.g., a picture of a car), a second object 106(2) (e.g., a coffee cup), a third object 106(3) (e.g., a lamp), a fourth object 106(4) (e.g., a picture of a sports arena), and a fifth object 106(5) (e.g., a desk). The system may then determine that the first image data represents the user 102. In some examples, to determine that the first image data represents the user 102, the system may analyze the first image data using one or more image processing techniques (e.g., using one or more facial recognition techniques) in order to determine the identity of the user 102. Additionally, or alternatively, in some examples, to determine that the first image data represents the user 102, the system may receive, from the user device, data representing credentials (e.g., a username, password, etc.) associated with the user 102. The system may then compare the credentials received from the user device to credentials stored in association with a user profile in order to identify the user 102.

In some examples, the system may initially analyze the first image data using one or more object recognition techniques. Based on the analysis, the system may identify the objects 106(1)-(5) (also referred to as "objects 106") represented by the first image data. For example, the system may determine that a first portion of the first image data represents the picture of the car, a second portion of the first image data represents the coffee cup, a third portion of the first image data represents the lamp, a fourth portion of the first image data represents the picture of a sports arena, and a fifth portion of the first image data represents the desk. In such examples, the system may then request that the user 102 select one or more of the objects 106 for the multi-factor authentication. In such examples, the request may indicate the objects 106 that are selectable by the user 102, such as by using graphical elements 108 (although only one is illustrated for clarity reasons). As described herein, a graphical element may include, but is not limited to, a border, a shading, text, an arrow, and/or any other content that may identify an object.

The user 102 may then select one or more of the objects 106 for multi-factor authentication. For instance, and in the example of FIG. 1, the user 102 may select the first object 106(1), the second object 106(2), and the third object 106(3). In some examples, the user 102 may also input an order for the selected objects 106(1)-(3). For instance, and again as shown in the example of FIG. 1, the user 102 may input an order that includes the first object 106(1) (represented by the arrow and the number "1"), followed by the second object 106(2) (represented by the arrow and the second number "2"), and finally followed by the third object 106(3) (represented by the arrow and the third number "3"). The system may then receive, from the user device, data associated with the objects 106(1)-(3) selected by the user 102 and/or the order input by the user 102. In some examples, the data may include the input data generated by the user device. However, in other examples, the data may include identifier data that identifies the objects 106(1)-(3) and/or the order.

The system may then generate and store environmental data in association with user profile data for the user 102. In some examples, the environmental data includes portions of the first image data that represent the objects 106(1)-(3) selected by the user 102. For example, the environmental data may represent the picture of a car, the coffee cup, and the lamp. Additionally, or alternatively, in some examples, the environmental data may represent identifiers (e.g., classifiers, names, etc.) of the objects 106(1)-(3) selected by the user 102. For example, the environmental data may represent a first identifier (e.g., a first classifier and/or a first name) that identifies the picture of the car, a second identifier (e.g., a second classifier and/or a second name) that identifies the coffee cup, and a third identifier (e.g., a third classifier and/or a third name) that identifies the lamp. Additionally, in examples where the user 102 selects an order for the objects 106(1)-(3), the system may also generate data representing the order. For instance, and in the example of FIG. 1, the data may represent an order that includes the first object 106(1), followed by the second object 106(2), and finally followed by the third object 106(3). The system may then use the environmental data to later authenticate the user 102.

For example, and at a second time which is shown by the bottom illustration, the system may receive second image data representing second image(s) 110. The system may then determine that the second image data represents the user 102 (e.g., a first factor of the multi-factor authentication). In some examples, to determine that the second image data represents the user 102, the system may analyze the second image data using one or more image processing techniques (e.g., using one or more facial recognition techniques). Additionally, or alternatively, in some examples, to determine that the second image data represents the user 102, the system may receive, from the user device (and/or another user device), data representing the credentials (e.g., a username, password, etc.) associated with the user profile of the user 102.

The system may then determine that the second image data represents the objects 106(1)-(3) previously selected by the user 102. For example, the system may analyze the second image data using one or more image analysis technique(s) (e.g., object recognition) in order to determine that the second image data also represents the first object 106(1), the second object 106(2), and the third object 106(3). In some examples, based on determining that the second image data also represents the objects 106(1)-(3), the system may determine that the user 102 is authenticated to access a resource. However, in other examples, the system may initially request that the user 102 indicate the order for the objects 106(1)-(3) before authenticating the user 102.

In such examples, the system may receive, from the user device (and/or the other user device), data representing inputs provided by the user 102. The system may then analyze the data in order to determine whether the user 102 selected the first object 106(1), followed by the second object 106(2), and finally followed by the third object 106(3). As shown in the example of FIG. 1, the system may determine that the user 102 did select the correct order for the objects 106(1)-(3). As such, the system may again authenticate the user 102 for access to the resource. However, in other examples, the system may determine that the user 102 did not select the correct order for the objects 106(1)-(3) (and/or selected an object 106(4) that was not previously selected by the user 102 for authentication). In such examples, the system may determine that the user 102 is not authenticated to access the resource. This is even if the system determined that the user 102 satisfied the first factor of the multi-factor authentication process.

As shown by the example of FIG. 1, the first image data represents a first FOV of a camera while the second image data represents a second FOV of a camera. This is because the first image data represents the fourth object 106(4) while the second image data represents a new object 112. Additionally, the second image data represents the second object 106(2) as being located in a different location within the environment than the first image data. However, since the objects 106(1)-(3) that were initially selected by the user 102 are still represented by the second image data, the system is still able to perform the multi-factor authentication process described herein. In other words, it does not matter if the FOV of the camera changes as long as the image data generated by the camera still represents each of the objects 106(1)-(3) selected by the user 102.

FIG. 2 illustrates a component diagram with an example environment in which techniques for authenticating a user may be provided, in accordance with the present concepts. The example environment 200 may include a cloud computing network 202 (e.g., network), a user device 204, and one or more additional user devices 206. Parentheticals are utilized after a reference number to distinguish like elements. Use of the reference number without the associated parenthetical is generic to the element. Additionally, although the example of FIG. 2 illustrates the user device 204 and the other user device(s) 206 as including desktop computers, in other examples, the user device 204 and/or the other user device(s) 206 may include any other type of device.

In some examples, the environment 200 comprises a data center or cloud-computing network comprising servers and other network components (e.g., routers, switches, etc.) stored across multiple data centers located across geographic areas. In these instances, the cloud-computing environment may be a distributed network through which devices interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs.

The user device 204 and/or the other user device(s) 206 may be communicatively coupled among one another and/or to various other devices via the cloud computing network 202. Within the example environment 200, the user device 204, the other user device(s) 206, and/or other devices may exchange communications (e.g., packets) via a network connection(s) to electronic device(s) 208 of the cloud computing network 202, indicated by double arrows 210. For instance, the network connections 210 may be transport control protocol (TCP) network connections or any network connection (e.g., information-centric networking (ICN)) that enables the devices to exchange packets with other devices via the cloud computing network 202. The network connections 210 represent, for example, a data path between each of the user device 204, the other user device(s) 206, and/or the electronic device(s) 208.

For example, the user device 204 and/or the other user device(s) 206 may be computers, laptops, mobile devices, tablets, etc., while the electronic device(s) 208 may be configured to provide data and/or network services, such as video conferencing, to the user device 204 and the other user device(s) 206. The electronic device(s) 208 may or may not be a producer, a point of generation, and/or origination of the data. For instance, the data may originate elsewhere for the electronic device(s) 208 to be able to provide the data to the user device 204 and/or the other user device(s) 206. Additionally, or alternatively, the data may pass through other network devices (e.g., router, switch) on a path between the electronic device(s) 208 and the user device 204 and/or the other user device(s) 206. It should be appreciated that the term "network connection" may also be referred to as a "network path." The use of a cloud computing network in this example is not meant to be limiting. Other types of networks are contemplated in accordance with the emergency notification concepts described herein.

The electronic device(s) 208 may perform multi-factor authentication in order to authorize users for resources. For example, if the user 102 associated with the user device 204 is attempting to join an online meeting with one or more users associated with the user device(s) 206, the electronic device(s) 208 may perform the multi-factor authentication in order to authorize the user 102 for the online meeting. However, before performing the multi-factor authentication, the electronic device(s) 208 may initially create authentication data 212 associated with the user 102.

For instance, and at "Step 1," the electronic device(s) 208 may receive, from the user device 204, first image data 214 representing the first image(s) 104 (e.g., a video), where the first image(s) depict the user 102 and an environment for which the user 102 is located. In some examples, an authentication component 216 of the electronic device(s) 208 may then identify the user 102 represented by the first image data 214, using one or more of the processes described herein. For example, if the user 102 has already created a user profile, where the user profile is represented by user profile data 218, then the authentication component 216 may use authentication data 212 that is stored in association with the user profile data 218 in order to identify the user 102. As shown, the authentication data 212 may initially include biometrics data 220 and/or the credentials data 222 that the authentication component 216 may use to identify the user 102 represented by the first image data 214.

Additionally, at "Step 1," the electronic device(s) 208 may receive input data 224 from the user device 204. A profile component 226 of the electronic device(s) 208 may then analyze the input data 224 in order to identify object(s) selected by the user 102 and/or an order for the object(s) selected by the user 102. Based on identifying the object(s) and/or the order for the object(s), and at "Step 2," the profile component 226 may then generate environment data 228 that represents the object(s) and/or the order for the object(s). As described herein, in some examples and for each object, the environment data 228 may include at least a portion of the first image data 214 that represents the object. Additionally, or alternatively, in some examples and for each object, the environmental data 228 may represent an identifier (e.g., a name, a type, etc.) associated with the object. In either of the examples, the profile component 226 may then store the environmental data 228 as part of the authentication data 212 for the user 102.

Later, and at "Step 3," the electronic device(s) 208 may receive, from the user device 204, a request to access a resource, such as the online meeting. Additionally, with the request, the electronic device(s) 208 may receive second image data 214 generated by the user device 204. Based on receiving the second image data 214, the authentication component 216 may then be configured to perform multi-factor authentication in order to authorize the user 102 for the resource. In some examples, to perform the multi-factor authentication, the authentication component 216 may analyze the second image data 214 using one or more biometric techniques and the biometrics data 220, such as facial recognition, in order to determine that the second image data 214 represents the user 102. Based on determining that the second image data 214 represents the user 102, the authentication component 216 may determine that a factor of the multi-factor authentication is satisfied. Additionally, or alternatively, in some examples, to perform the multi-factor authentication, the authentication component 216 may receive input data 224 that represents credentials associated with the user profile. The authentication component 216 may then compare the received credentials to credentials represented by the credentials data 222. Based on identifying a match between the received credentials and the credentials represented by the credentials data 222, the authentication component 216 may determine that a factor of the multi-factor authentication is satisfied.

The authentication component 216 may also use the environment data 228 to authenticate the user using the multi-factor authentication. For instance, and at "Step 4," the authentication component 216 may analyze the second image data 214 in order to determine if the second image data 214 represents each of the object(s) from the environmental data 228. For example, the authentication component 216 may analyze the second image data 214 using one or more of the object recognition techniques described herein in order to determine whether the second image data 214 represents the object(s). In some examples, if the authentication component 216 determines that the second image data 214 represents the object(s), then the authentication component 216 may determine that an additional factor of the multi-factor authentication is satisfied. However, if the authentication component 216 determines that the second image data 214 does not represent one or more of the object(s), then the authentication component 216 may determine that the other factor is not satisfied.

Figure 3:
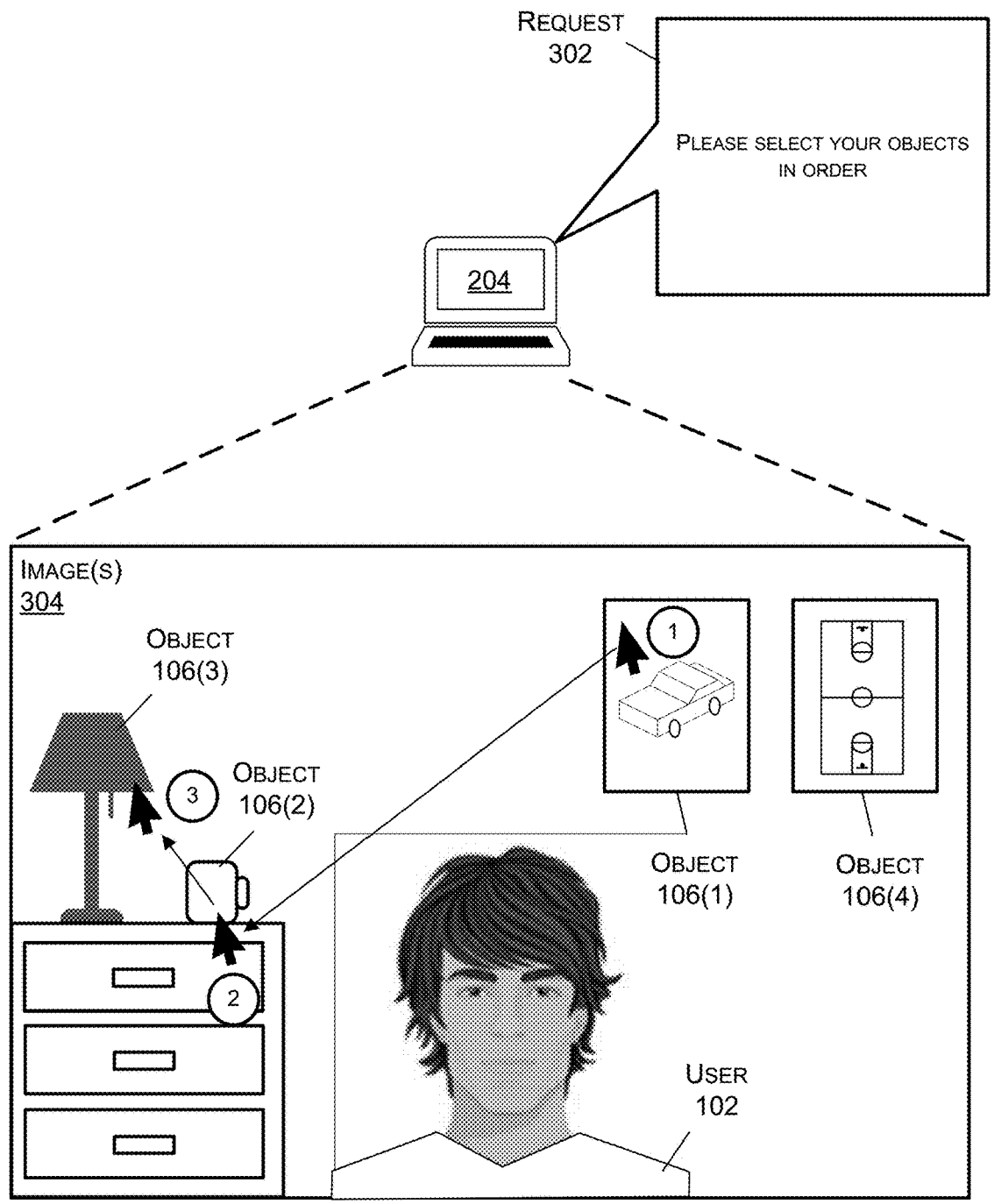
FIG. 3 illustrates an example of a user selecting an order for objects, in accordance with the present concepts.

In some examples, and in addition to determining that the second image data 214 represents the object(s), the authentication component 216 may verify the order associated with the objects. For example, and as illustrated in the example of FIG. 3, the authentication component 216 may generate a request for the order, where the request is represented by request data 230. In some examples, the request data 230 includes audio data representing the request. Additionally, or alternatively, in some examples, the request data 230 represents content, such as a notification or message, that includes the request. In either of the examples, the electronic device(s) 208 may send the request data 230 to the user device 204 for output by the user device 204. Based on sending the request data 230, the electronic device(s) 208 may receive, from the user device 204, input data 224 representing inputs selecting the objects. The authentication component 216 may then determine that (1) the user 102 selected the correct objects and (2) that the user 102 selected the objects in the correct order. Based on the determinations, the authentication component 216 may determine that the other factor is satisfied.

Figure 4:
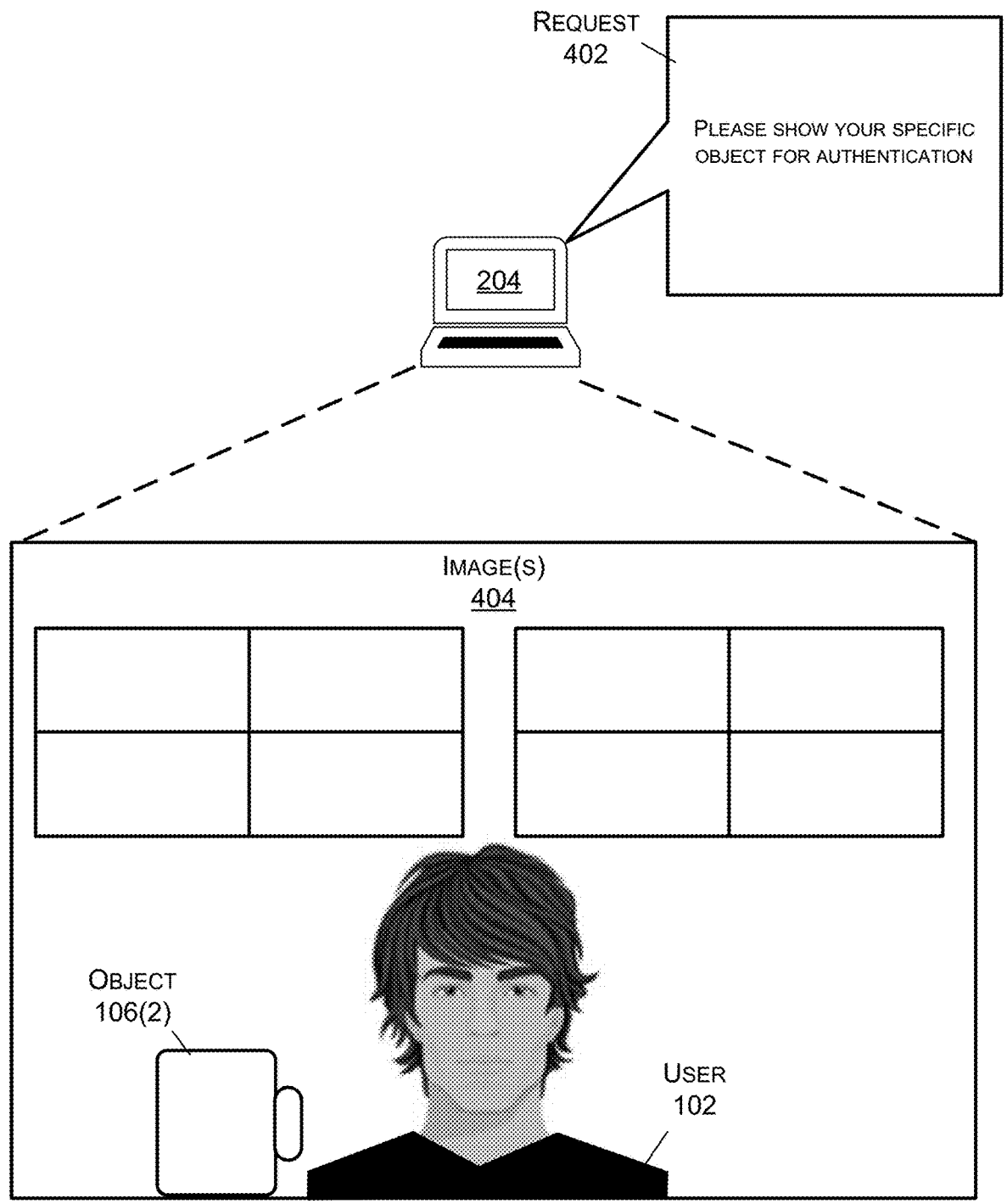
FIG. 4 illustrates an example of performing active authentication, in accordance with the present concepts.

While these examples have described situations where the second image data 214 already represents the object(s) (e.g., passive object(s)), in other examples, the second image data 214 may not already represent the object(s) (e.g., active object(s)). Rather, and as illustrated in FIG. 4, the authentication component 216 may generate a request for the user 102 to show object(s), where the request is again represented by request data 230. In some examples, the request data 230 again includes audio data representing the request. Additionally, or alternatively, in some examples, the request data 230 represents content, such as a notification or message, that includes the request. In either of the examples, the electronic device(s) 208 may send the request data 230 to the user device 204 for output by the user device 204. The electronic device(s) 208 may then receive third image data 214 from the user device 204. Based on receiving the third image data 214, the authentication component 216 may analyze the third image data 214 in order to determine that the third image data 214 now represents the object(s) (e.g., the third image data 214 represents the user showing the object(s)). Based on the determination, the authentication component 216 may determine that the other factor is satisfied.

Once the authentication component 216 authenticates the user using the multi-factor authentication, the electronic device(s) 208 may provide the user 102 with access to the resource. For example, the electronic device(s) 208 may connect the user device 204 to the online meeting with the other user device(s) 206.

As further illustrated in the example of FIG. 2, the electronic device(s) 208 may include processor(s) 232, network interface(s) 234, and memory 236. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network Interface(s) may enable communication of data between the devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

FIG. 3 illustrates an example of the user 102 selecting an order for objects 106(1)-(3), in accordance with the present concepts. For instance, and as shown, the user device 204 may output a request 302 for the user 102 to select the objects 106(1)-(3) in order. In the example of FIG. 3, the request 302 includes sound that is output by the user device 204. However, in other examples, the request 302 may include any other type of content, such as a notification or message, that is displayed by the user device 204. Based on the request 302, the user 102 may use image(s) 304 being displayed by the user device 204 in order to select the order for the objects 106(1)-(3). For instance, and as shown by the example of FIG. 3, the user 102 may select the first object 106(1), followed by the second object 106(2), and finally followed by the third object 106(3). The user device 204 may then generate input data 224 representing the inputs, where the authentication component 216 of the electronic device(s) 208 uses the input data 224 to determine whether the order is correct.

FIG. 4 illustrates an example of performing active authentication, in accordance with the present concepts. For instance, and as shown, the user device 204 may output a request 402 for the user 102 to show the second object 106(2) that the user 102 selected for authentication (e.g., an active object). In the example of FIG. 4, the request 402 includes sound that is output by the user device 204. However, in other examples, the request 402 may include any other type of content, such as a notification or message, that is displayed by the user device 204. Based on the request 402, the user 102 may show the second object 106(2) such that the second object 106(2) is within the FOV of the user device 204. For instance, and as shown by the example of FIG. 4, the user device 204 generates image(s) 404 depicting the user 102 showing the second object 106(2). The user device 204 may then send image data 214 representing the image(s) 404 to the electronic device(s) 208. Using the image data 214, the authentication component 216 of the electronic device(s) 208 may authenticate the user 102.

Figure 5:
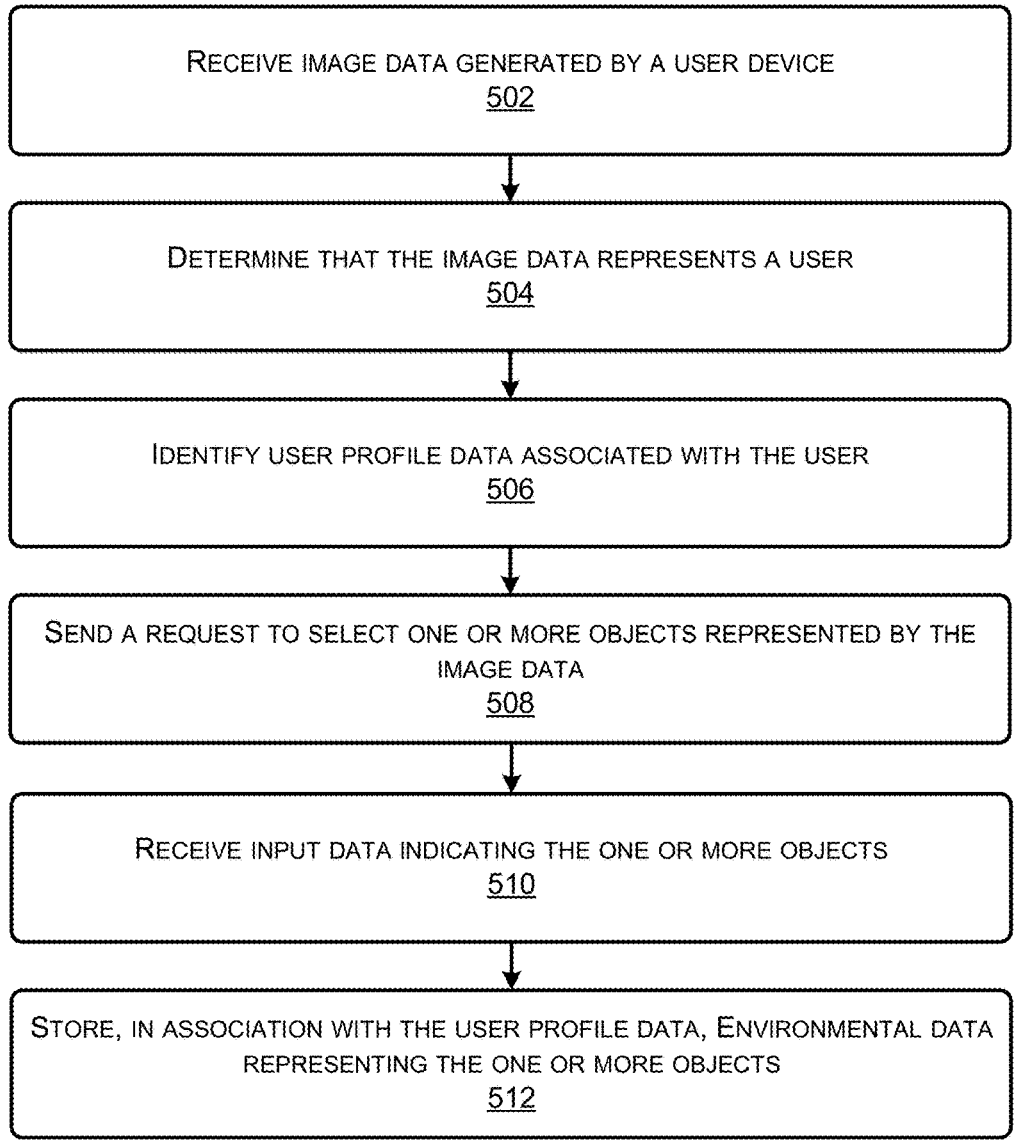
FIG. 5 illustrates a flow diagram of an example process for generating environmental data associated with a user profile, in accordance with the present concepts.

FIG. 5 illustrates a flow diagram of an example process 500 for generating environmental data associated with a user profile, in accordance with the present concepts. An operation 502 represents receiving image data generated by a user device. For instance, the electronic device(s) 208 may receive the image data generated by the user device. In some examples, the electronic device(s) 208 receive the image data in response to a user associated with the user device attempting to access a resource. The image data may represent at least the user and an environment for which the user is located. Additionally, the environment may include various objects, such as picture(s), window(s), door(s), light(s), book(s), and/or any other type of object.

An operation 504 represents determining that the image data represents a user and an operation 506 represents identifying user profile data associated with the user. For instance, the electronic device(s) 208 may determine that the image data represents the user. In some examples, the electronic device(s) 208 determine that the image data represents the user based on analyzing the image data using one or more computer-vision techniques (e.g., facial recognition). Additionally, or alternatively, in some examples, the electronic device(s) 208 determine that the image data represents the user based on receiving, from the user device, credentials data associated with user. In either of the examples, such as when the user has previously created a user profile, the electronic device(s) 208 may identify the user profile data associated with the user. However, in other examples, the electronic device(s) 208 may then generate the user profile data associated with the user.

An operation 508 represents sending a request to select one or more objects represented by the image data. For instance, the electronic device(s) 208 may determine that the user needs to setup the multi-factor authentication for the user profile. As such, the electronic device(s) 208 may generate the request to select the one or more objects represented by the image data. The electronic device(s) 208 may then send, to the user device, data represents the request so that the user device is able to output the request to the user. As described herein, the data may represent any type of content, such as sound, image(s), a video, and/or the like that includes the request.

An operation 510 represents receiving input data indicating the one or more objects and an operation 512 represents storing, in association with the user profile data, environmental data representing the one or more objects. For instance, the electronic device(s) 208 may then receive, from the user device, the input data representing the selection of the one or more objects. In some examples, such as when the user selects more than one object, the input data may further represent an order for the objects. The electronic device(s) 208 may then analyze the image data in order to identify the one or more objects. Additionally, the electronic device(s) 208 may generate the environmental data that represents the one or more objects and store the environmental data in association with the user profile data. As described herein, in some examples and for each object, the environmental data may include at least a portion of the image data that represents the object. Additionally, or alternatively, in some examples and for each object, the environmental data may represent an identifier (e.g., a name, a type, etc.) associated with the object.

Figure 6:
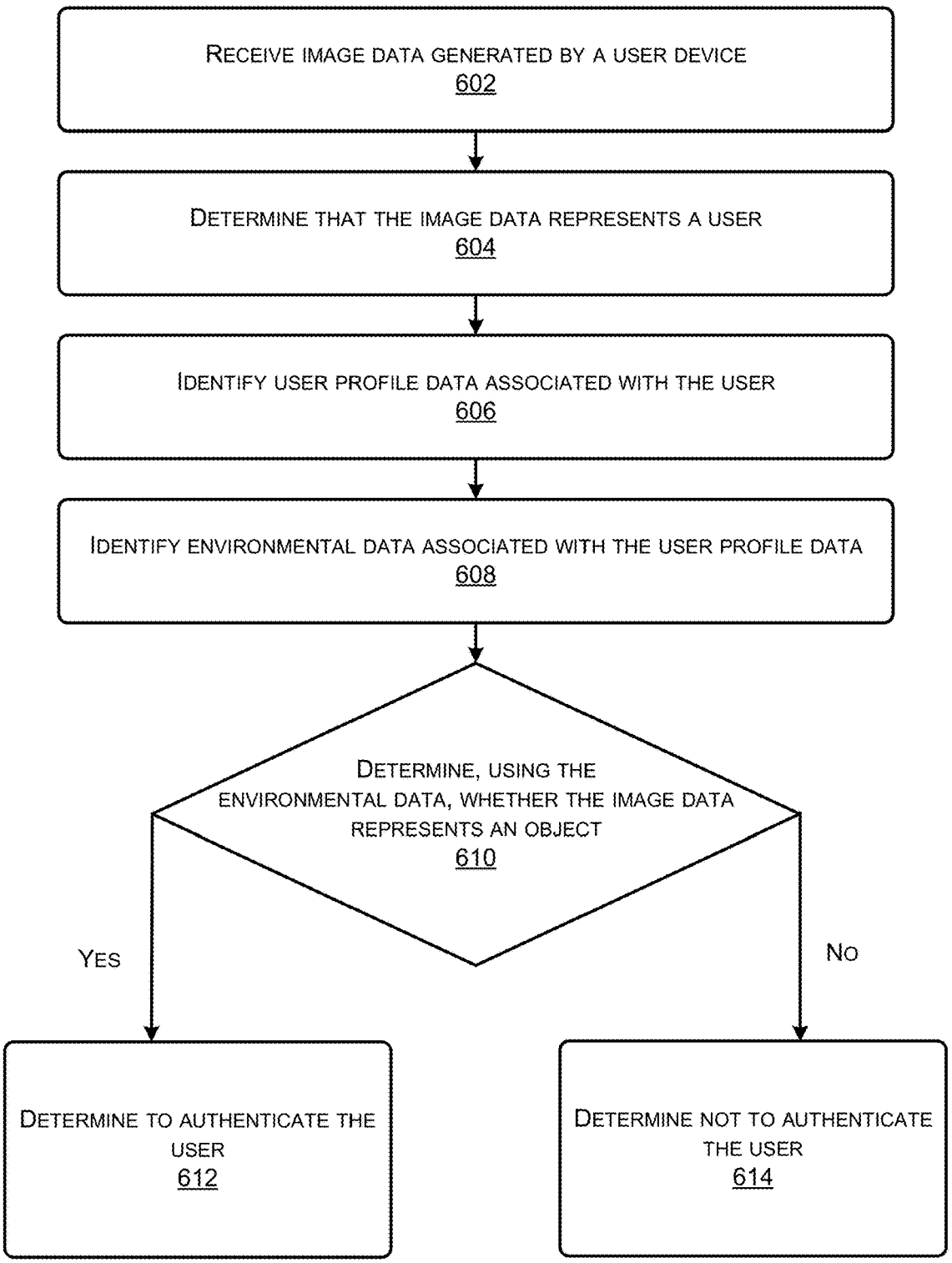
FIG. 6 illustrates a flow diagram of an example process for authenticating a user using environmental data, in accordance with the present concepts.

FIG. 6 illustrates a flow diagram of an example process 600 for authenticating a user using environmental data, in accordance with the present concepts. An operation 602 represents receiving image data generated by a user device. For instance, the electronic device(s) 208 may receive the image data generated by the user device. In some examples, the electronic device(s) 208 receive the image data in response to a user associated with the user device attempting to access a resource. The image data may represent at least the user and an environment for which the user is located. Additionally, the environment may include various objects, such as picture(s), window(s), door(s), light(s), book(s), and/or any other type of object.

An operation 604 represents determining that the image data represents a user and an operation 606 represents identifying user profile data associated with the user. For instance, the electronic device(s) 208 may determine that the image data represents the user. In some examples, the electronic device(s) 208 determine that the image data represents the user based on analyzing the image data using one or more computer-vision techniques (e.g., facial recognition). Additionally, or alternatively, in some examples, the electronic device(s) 208 determine that the image data represents the user based on receiving, from the user device, credentials data associated with user. In either of the examples, determining that the image data represents the user may include the first factor of the multi-factor authentication that the electronic device(s) 208 use to authenticate the user.

An operation 608 represents identifying environmental data associated with the user profile data and an operation 610 represents determining, using the environmental data, whether the image data represents an object. For instance, the electronic device(s) 208 may determine that the user profile data is associated with the environmental data. As described herein, the environment data may represent at least one or more objects and/or an order associated with the object(s) for authenticating the user. The electronic device(s) 208 may then analyze the image data, using the environmental data, to determine whether the image data represents the object(s). Additionally, in examples where the environment data further represents an order for the object(s), the electronic device(s) 208 may receive input data from the user device. The electronic device(s) 208 may then determine, using the input data, whether the order indicated by the user is similar to the order represented by the environmental data.

As described herein, in some examples, the object(s) may include passive object(s) that should be located in the FOV of the user device such that the image data already represents the object(s). However, in other examples, the object(s) may include activate object(s) that may not currently be located in the FOV of the user device such that the image data does not currently represent the object(s). In such examples, the electronic device(s) 208 may send, to the user device, data representing a request to show the object(s). The electronic device(s) 208 may then receive additional image data representing the user showing the object(s).

If, at operation 610, it is determined that the image data represents the object(s) (and/or that the order for the object(s) is correct), then an operation 612 represents determining to authenticate the user. For instance, if the electronic device(s) 208 determine that the image data represents the object(s) (and/or that the order for the object(s) is correct), then the electronic device(s) 208 may determine that the user is authenticated. In other words, the electronic device(s) 208 may determine that the second factor of the multi-factor authentication process is satisfied. As such, the electronic device(s) 208 may provide the user with access to the resource.

However, if, at operation 610, it is determined that the image data does not represent the object(s) (and/or that the order for the object(s) is incorrect), then an operation 614 represents determining not to authenticate the user. For instance, if the electronic device(s) 208 determine that the image data does not represent the object(s) (and/or that the order for the object(s) is incorrect), then the electronic device(s) 208 may determine that the user is not authenticated. In other words, the electronic device(s) 208 may determine that the second factor of the multi-factor authentication process is not satisfied. As such, the electronic device(s) 208 may not provide the user with access to the resource.

Figure 7:
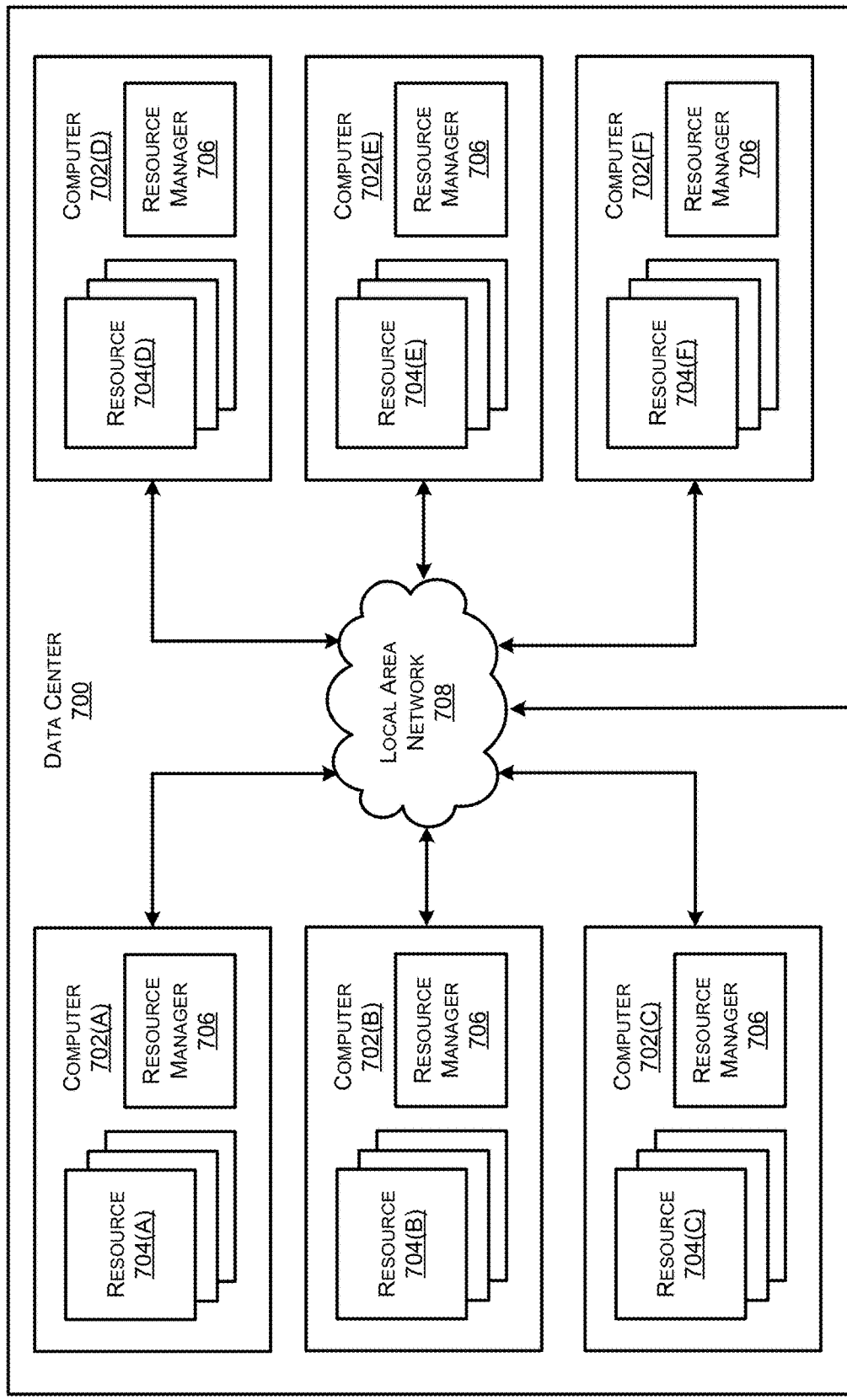
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several computers 702A-702F (which might be referred to herein singularly as "a computer 702" or in the plural as "the computers 702") for providing computing resources. In some examples, the resources and/or computers 702 may include, or correspond to, any type of networked device described herein. Although, computers 702 may comprise any type of networked device, such as servers, switches, routers, hubs, bridges, gateways, modems, repeaters, access points, hosts, etc.

The computers 702 can be standard tower, rack-mount, or blade server computers configured appropriately for providing computing resources. In some examples, the computers 702 may provide computing resources 704 including data processing resources such as virtual machine (VM) instances or hardware computing systems, database clusters, computing clusters, storage clusters, data storage resources, database resources, networking resources, and others. Some of the computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer 702. Computers 702 in the data center 700 can also be configured to provide network services and other types of services.

In the example data center 700 shown in FIG. 7, an appropriate local area network (LAN) 708 is also utilized to interconnect the computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the computers 702A-702F in each data center 700, and, potentially, between computing resources in each of the computers 702. It should be merely illustrative and that other implementations can be utilized.

In some examples, the computers 702 may each execute one or more application containers and/or virtual machines to perform techniques described herein. For instance, the containers and/or virtual machines may serve as server devices, user devices, and/or routers in the cloud computing network.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
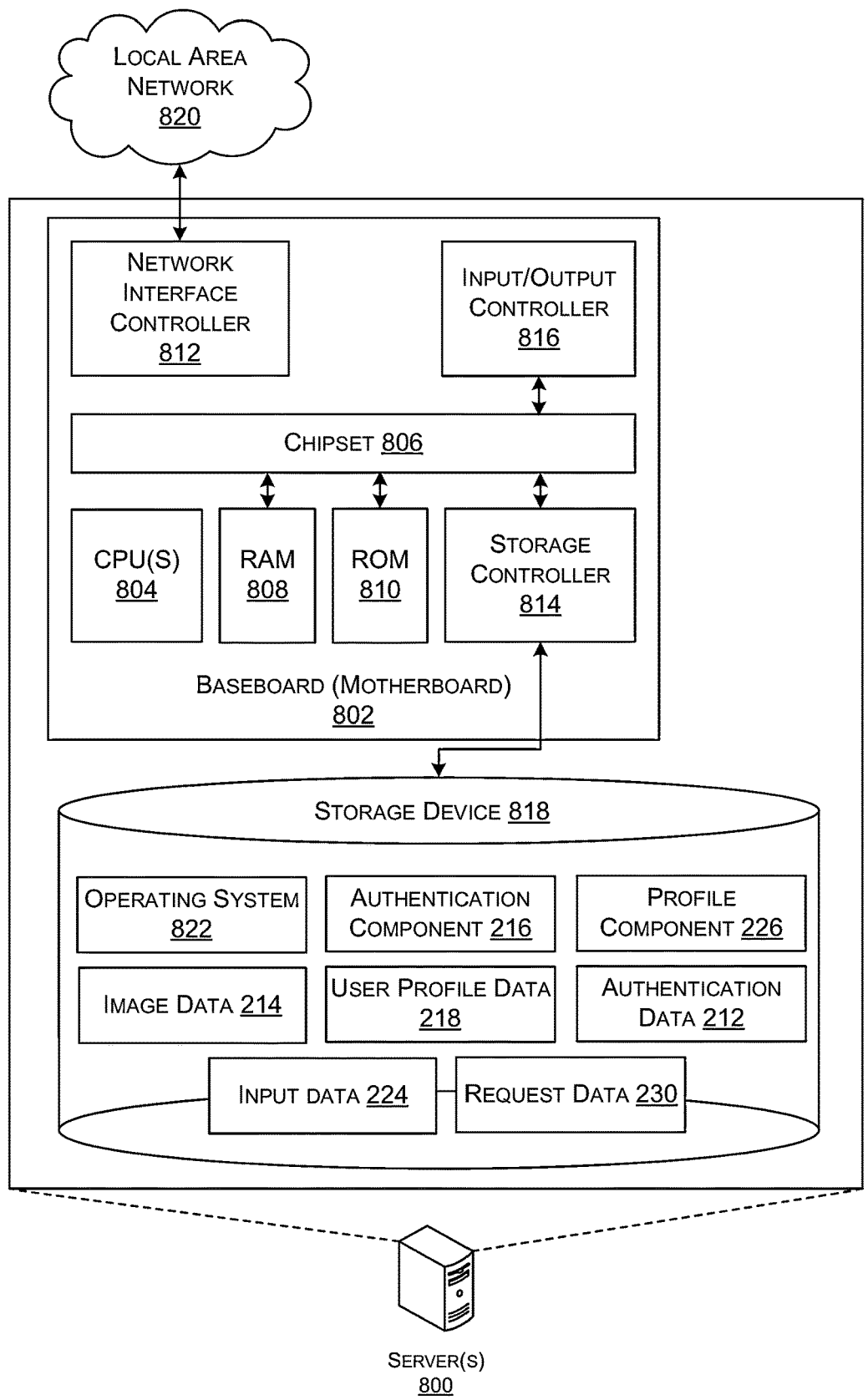
FIG. 8 is a computer architecture diagram showing an illustrative computer hardware architecture for implementing a server computing device that can be utilized to implement aspects of the various technologies presented herein.

FIG. 8 is a computer architecture diagram showing an illustrative computer hardware architecture for implementing a server computing device 800 that can be utilized to implement aspects of the various technologies presented herein. The electronic device(s) 208, the user device 204, and/or the user device(s) 206 discussed above, may include some or all of the components discussed below with reference to the server computing device 800.

To begin, the server computer 800 can be standard tower, rack-mount, or blade server computers configured appropriately for providing the computing resources described herein. As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the servers 800 can also be configured to execute a resource manager capable of instantiating and/or managing the computing resources. In the case of VM instances, for example, the resource manager can be a hypervisor or another type of program configured to enable the execution of multiple VM instances on a single server computer 800. Server computers 800 in a data center can also be configured to provide network services and other types of services.

The server computer 800 includes a baseboard 802, or "motherboard," which is a printed circuit board to which a multitude of components or devices can be connected by way of a system bus or other electrical communication paths. In one illustrative configuration, one or more central processing units (CPUs) 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as a local area network 820. The chipset 806 can include functionality for providing network connectivity through a Network Interface Card (NIC) 812, such as a gigabit Ethernet adapter. The NIC 812 is capable of connecting the computer 800 to other computing devices over the network. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 822 and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI (SAS) interface, a serial advanced technology attachment (SATA) interface, an FC interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the computer 800, and or any components included therein, may be supported by one or more devices similar to computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 3 and 4. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As further illustrated in the example of FIG. 8, the computer 800 may store the authentication component 216, the profile component 226, the image data 214, the user profile data 218, the authentication data 212, the input data 224, and/or the request data 230.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A system comprising:
one or more processors; and
one or more non-transitory computer-readable media storing instructions that, when executed by the one or more processors, cause the system to perform operations comprising:
receiving first image data generated by a first user device;
determining that the first image data represents a user;
identifying user profile data associated with the user;
sending, to the first user device, a request to select multiple objects represented by the first image data;
receiving input data from the first user device;
determining that the input data indicates a first object represented by the first image data as being at a first location and a second object represented by the first image data as being at a second location, wherein the first object and the second object are static to an environment of the user and not part of or carried on a person of the user;
storing, in association with the user profile data, authentication data associated with the first object being at the first location and the second object being at the second location;
receiving, from the first user device or a second user device, second image data;
analyzing the second image data to determine that a portion of the second image data represents the first object associated with the first location and the second object associated with the second location;
determining that the first object associated with the first location and the second object associated with the second location represented in the second image data corresponds to the authentication data that is stored in association with the user profile data; and
determining that the user is verified based at least in part on the first object being associated with the first location and the second object being associated with the second location represented in the second image data corresponding to the authentication data that is stored in association with the user profile data.

2. The system as recited in claim 1, the operations further comprising:
analyzing the second image data using one or more facial recognition algorithms; and
determining that the second image data represents the user,
and wherein determining that the user is verified is further based at least in part on the second image data representing the user.

3. The system as recited in claim 1, wherein the input data is first input data, the authentication data is first authentication data, and wherein the operations further comprise:
receiving second input data from the first user device or the second user device;
determining that the second input data indicates the second object represented by the first image data; and
storing, in association with the user profile data, second authentication data associated with the second object.

4. The system as recited in claim 3, the operations further comprising:
receiving, from the first user device or the second user device, third input data representing an order for objects, the order indicating the first object followed by the second object; and
storing, in association with the user profile data, third authentication data representing the order for the objects.

5. The system as recited in claim 4, the operations further comprising:
receiving, at a first time, fourth input data indicating the first object represented by the second image data;
receiving, at a second time that is after the first time, fifth input data indicating the second object represented by the second image data; and
determining that the user is verified based at least in part on the third authentication data, the fourth input data, and the fifth input data.

6. The system as recited in claim 1, the operations further comprising:
sending, to the first user device or the second user device, a request to select one or more objects for authentication, and wherein receiving the input data is based at least in part on sending the request.

7. The system as recited in claim 1, wherein the operations further comprise:
determining that the second image data represents the user;
based at least in part on the second image data representing the user, sending a request associated with presenting the first object;
receiving third image data generated by the first user device or the second user device;
determining, based at least in part on the authentication data, that the third image data represents the first object; and
determining that the user is verified based at least in part on the third image data representing the first object.

8. The system as recited in claim 1, wherein storing the authentication data comprises at least one of:
storing, in association with the user profile data, at least a portion of the first image data representing the first object; or
storing, in association with the user profile data, object data indicating an identifier associated with the first object.

9. A method comprising:
receiving first image data generated by a first user device;
determining that the first image data represents a user;
identifying user profile data associated with the user;
sending, to the first user device, a request to select multiple objects, represented by the first image data;
receiving, from the first user device, input data indicating at indicates a first object represented by the first image data as being at a first location and a second object represented by the first image data as being at a second location, wherein the first object and the second object are static to an environment of the user and not part of or carried on a person of the user;
storing, in association with the user profile data, authentication data associated with the first object being at the first location and the second object being at the second location;
receiving, from the first user device or a second user device, second image data;
analyzing the second image data to determine that a portion of the second image data represents the first object associated with the first location and the second object associated with the second location;
determining the first object associated with the first location and the second object associated with the second location represented in the second image data corresponds to the authentication data that is stored in association with the user profile data; and
determining that the user is verified based at least in part on the first object being associated with the first location and the second object being associated with the second location represented in the second image data corresponding to the authentication data that is stored in association with the user profile data.

10. The method as recited in claim 9, further comprising:
analyzing the second image data using one or more facial recognition algorithms; and
determining that the second image data represents the user,
and wherein determining that the user is verified is further based at least in part on the second image data representing the user.

11. The method as recited in claim 9, wherein the input data is first input data, the authentication data is first authentication data, and wherein the method further comprises:
receiving, from the first user device or the second user device, second input data indicating the second object; and
storing, in association with the user profile data, second authentication data associated with the second object.

12. The method as recited in claim 11, further comprising:
receiving, from the first user device or the second user device, third input data representing an order for objects, the order indicating the first object followed by the second object; and
storing, in association with the user profile data, third authentication data representing the order for the objects.

13. The method as recited in claim 12, further comprising:
receiving, at a first time, fourth input data indicating the first object represented by the second image data;
receiving, at a second time that is after the first time, fifth input data indicating the second object represented by the second image data; and
determining that the user is verified based at least in part on the third authentication data, the fourth input data, and the fifth input data.

14. The method as recited in claim 9, wherein the request further indicates the first portion of the first image data.

15. The method as recited in claim 9, further comprising:
receiving third image data generated by the first user device or the second user device;
determining, based at least in part on the authentication data, that the third image data represents the first object; and
determining that the user is verified based at least in part on the third image data representing the first object.

16. The method as recited in claim 9, wherein storing the authentication data comprises at least one of:
storing, in association with the user profile data, at least a portion of the first image data representing the first object; or
storing, in association with the user profile data, object data indicating an identifier associated with the first object.

17. A system comprising:
one or more processors; and
one or more non-transitory computer-readable media storing instructions that, when executed by the one or more processors, cause the system to perform operations comprising:
receiving first image data generated by a first user device;
determining that the first image data represents a user;
identifying user profile data associated with the user;
determining a first object represented by the first image data as being at a first location, wherein the first object is static to an environment of the user and not part of or carried on a person of the user;
determining a second object represented by the first image data as being at a second location, wherein the second object is static to the environment of the user and not part of or carried on a person of the user;
determining an order that includes the first object being at the first location followed by the second object being at the second location;
storing, in association with the user profile data, authentication data that represents the order;

receiving, from the first user device or a second user device, second image data;

analyzing the second image data to determine that a portion of the second image data represents the first object associated with the first location and the second object associated with the second location;

determining that the first object associated with the first location and the second object associated with the second location are illustrated in the order represented in the second image data that corresponds to the authentication data that is stored in association with the user profile data; and determining that the user is verified based at least in part on first object being associated with the first location and the second object being association with the second location being illustrated in the order in the second image data corresponding to the authentication data that is stored in association with the user profile data.

18. The system as recited in claim 17, the operations further comprising:

receiving, at a first time, first input data indicating the first object represented by the second image data;

receiving, at a second time that is after the first time, second input data indicating the second object represented by the second image data; and determining that the user is verified based at least in part on the authentication data, the first input data, and the second input data.

\* \* \* \* \*